Figure 4:
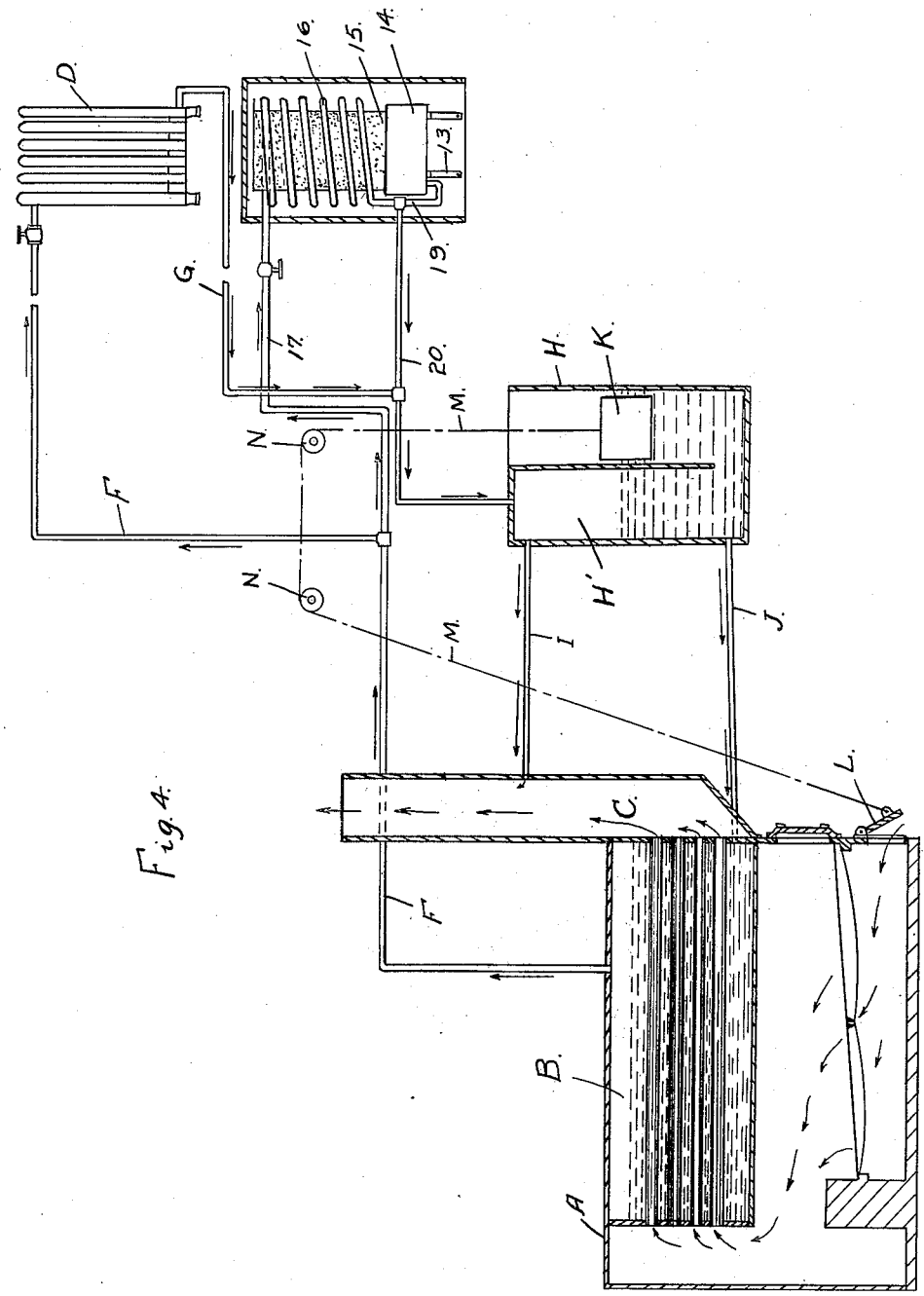

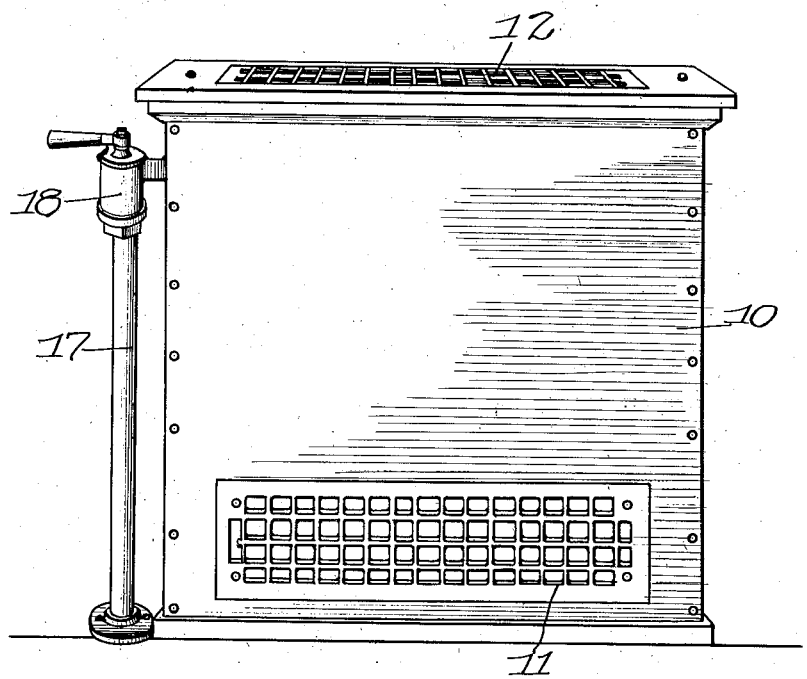
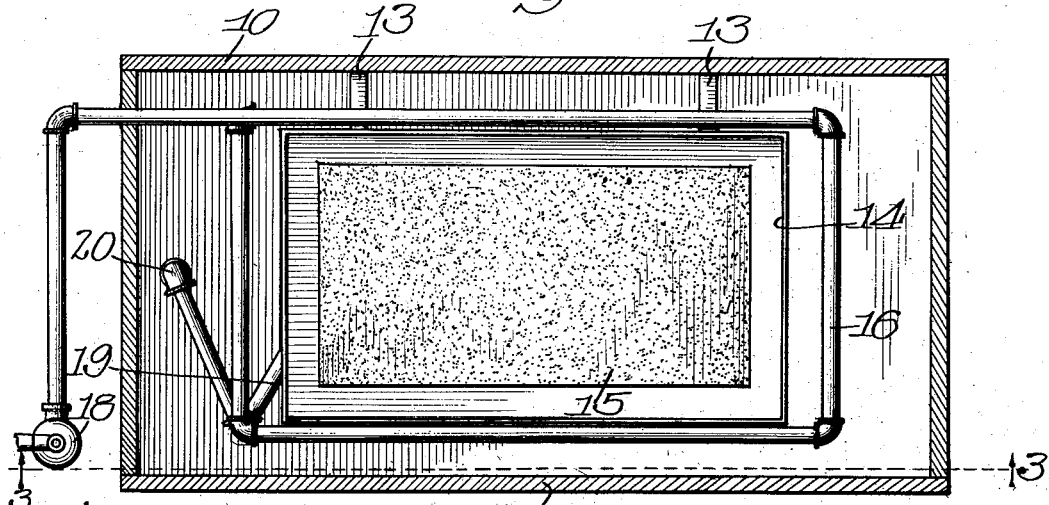

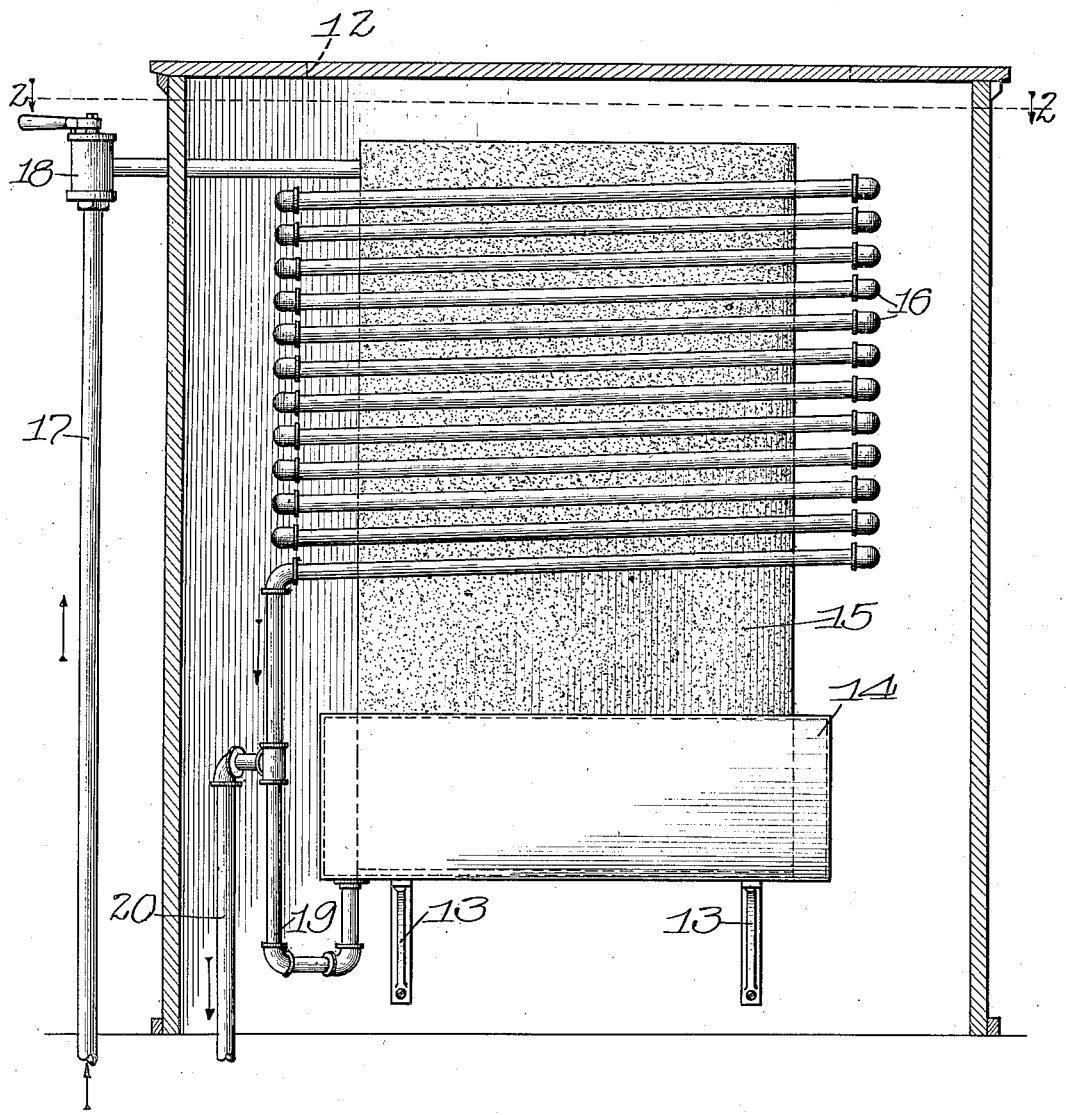

F. J. DOUGLASS.
HUMIDIFYING DEVICE.
APPLICATION FILED JULY 30, 1912.

1,094,544.

Patented Apr. 28, 1914.
3 SHEETS—SHEET 3.

WITNESSES:
H. M. Gillespie
J. B. Lagorio

INVENTOR.
Frank J. Douglass
BY Barnett & Truman
ATTORNEYS.

UNITED STATES PATENT OFFICE.

FRANK J. DOUGLASS, OF CHICAGO, ILLINOIS.

HUMIDIFYING DEVICE.

1,094,544. Specification of Letters Patent. Patented Apr. 28, 1914.

Application filed July 30, 1912. Serial No. 712,373.

*To all whom it may concern:*

Be it known that I, FRANK J. DOUGLASS, a citizen of the United States, residing at Chicago, in the county of Cook and State of Illinois, have invented certain new and useful Improvements in Humidifying Devices, of which the following is a specification.

My invention relates to devices for imparting humidity to atmosphere of apartments overdried by artificial heating and it consists in certain novel instrumentalities, constructions and arrangements for effectively and conveniently accomplishing this result.

Having reference to the specific apparatus which I have devised for attaining the desired result, the invention consists further in the use of a steam coil which may perform the functions both of a heater and a condenser, the coil supplying, by condensation, the water to be evaporated and preferably, but not necessarily, also constituting a part of the heating system.

The object of my invention is, furthermore, to provide a humidifying device that may be used in connection with a steam heating system, which is effective in its operation, compact and inexpensive to manufacture, and not unsightly in appearance.

The invention consists further in the novel constructions, arrangements and devices in humidifying apparatus shown in the drawings hereto annexed and which will be hereinafter more particularly described and claimed.

The drawings show a preferred form of apparatus for carrying out the purposes of my invention, it being understood that some modifications might be made without departure from the invention.

In the drawings, Figure 1 is a perspective view of the device, Fig. 2 is a sectional plan of the same, being taken on the line 2—2 of Fig. 3, Fig. 3 a sectional elevation taken on the line 3—3 of Fig. 2, looking in the direction of the arrows. Fig. 4 is a sectional elevation illustrating somewhat diagrammatically the application of my invention to a vapor heating system of familiar type.

Like characters of reference designate like parts in the several figures of the drawings.

Referring to the drawings, 10 designates a box or casing formed with one or more air inlets 11 located below the air outlet 12. Within the box supported on suitable brackets 13 is a water storage vessel 14 open at the top. In this vessel is placed a porous element 15 adapted to absorb water from the vessel 14 by capillary attraction. This element may consist of a block of unglazed tile. Preferably surrounding the tile 15 is a steam coil 16, one end of which is connected to the steam pipe 17 through a valve 18, the pipe 17 leading from some source of supply of steam, for example, being connected with the steam heating system that heats the apartment in which the humidifying device is located. Preferably the valve 18 is one of the common types of quick action valve capable of being conveniently manipulated to vary the amount of steam admitted to the coil from the supply pipe 17 in such manner that the position of the handle indicates the degree of opening of the valve. The lower end of coil 16 is connected by means of a pipe 19 with the water storage vessel 14. An overflow pipe 20 taps pipe 19 at about the level of the top of the storage vessel. This pipe may, if desired, lead back to the boiler of the heating system.

The best results are obtained with the type of vacuum heating system in which the pipe 20 leads to an exhaust mechanism or, by suitable connections, to the chimney to which the boiler fire box is connected, so that the draft of the chimney produces an exhaust in the pipe 20, the overflow water through pipe 20 being trapped to the boiler or to any suitable point of discharge. In this manner a constant flow of steam to the steam coil 16 is insured when the valve 18 is open.

In Fig. 4 I have shown the application of my humidifying device to a vapor heating system of familiar type.

A designates a furnace having a boiler B and smoke stack C.

D designates one of the radiators which receives steam from the boiler through pipe F and discharges its water of condensation through pipe G into the compartment H' of a tank H. The pipe 17 to coil 16 leads from supply pipe F. The pipe 20 leads to the return pipe G. The compartment H' is connected with the stack C by a pipe I so that a vacuum is set up in the compartment H' which promotes the circulation through the system. A pipe J leads from the receptacle H, below the normal water level, to the boiler B. The water in the vessel and in the boiler, therefore, stand at the same level provided there be no difference in pressure above these bodies of water. In the vessel H is a float K connected with the damper L of the furnace A by a cord M which runs over pulleys N. An excess of pressure in the boiler raises the water level in the vessel H, with the result that the damper L is closed and the fire slowed down.

I do not claim as my invention the devices for collecting water of condensation and for opening and closing the furnace damper, these arrangements being familiar in the heating art and being shown merely for the purpose of illustrating the application of my invention to a known operative vapor system.

The operation of the humidifying apparatus is as follows: Steam entering the coil 16 condenses and the resulting water accumulates in the container 14 and saturates the porous element 15. Air in the heated apartment flows in the opening 11 and out at 12, the coil 16 facilitating this circulation. The air absorbs moisture from the porous element. The circulation of steam, air and water is continuous and thus the air in the room is humidified. By means of the valve 18 the supply of water to the porous element may be controlled, while any overflow will be carried off through pipes 19 and 20. Where the device is connected with a heating system such as that just described it will automatically operate, whenever the heating system is in operation, to continuously supply the air in the heated apartment with the additional moisture which the operation of the heating system necessitates. When the heating system is shut off the humidifier will automatically cease to operate, unless it is separately operated, as may be done if required.

It will be seen that by utilizing the heating element of the device for supplying water for evaporation the device automatically keeps itself supplied with water and so requires no attention in this regard. Furthermore, it automatically adjusts itself to varying conditions. As the weather is colder and the heating system is called upon to supply a greater amount of heat, the air in the room is made proportionately drier and requires an increased evaporation of water in the humidifying device. Under such conditions of increased steam flow and more rapid radiation, the rate of condensation in the coil 16 will be increased since the coil will necessarily operate as a radiator and will ordinarily be so located as to perform its part in heating the apartment. The increased temperature of the air will increase the rate of evaporation, supplying the atmosphere with more moisture as more moisture is needed. Similarly the increased amount of condensation taking place in the coil will increase the amount of water supplied to the storage tank so as to meet the increased demand for water resulting from the more rapid evaporation. Obviously the humidifier need not be a part of a heating system, and the coil 16 need not necessarily be located around the porous element, or even in the heated apartment where the air is to be humidified, but, for best results, it will be constructed and arranged as shown in the drawings. So, also, while I consider that the best results are attained with the parts assembled and operating as shown, as an integral element of a vacuum or low pressure steam heating system, the invention might be advantageously used in connection with heating systems of different type. These and similar modifications which will occur to those skilled in the art are contemplated by me as coming within the scope of my invention.

I claim:

1. The combination with a steam heating element, of an evaporator, and a water receptacle for supplying water to said evaporator, all so arranged that said evaporator is heated by said heating element and said heating element discharges its water of condensation to said receptacle which supplies said evaporator.

2. In a humidifying device, the combination with a casing provided with an air intake and an air outlet, of a vessel in said casing adapted to contain water, a porous element arranged to receive water from said vessel, and means within said casing for applying heat to the porous element to cause evaporation therefrom.

3. In a humidifying device, the combination with a vessel to contain water, of a porous element in said vessel and projecting therefrom, and a steam coil surrounding the projecting part of said porous element and having a discharge connection for water of condensation leading to said vessel.

4. In a humidifying device, the combination with a casing provided with intake and outlet openings, of a vessel for water in said casing, a porous element in said vessel and projecting therefrom a steam coil surrounding said porous element, means for controllably admitting steam to said steam coil, and a discharge pipe adapted to conduct water of condensation from said coil to said vessel.

5. The combination with a vacuum heating system, of a humidifying device comprising a vessel adapted to contain water, a porous element projecting therefrom, a heating coil forming a part of said vacuum system surrounding said porous element, and a discharge connection from the lower end of the heating coil to said vessel.

6. A humidifier comprising the combination with a water receptacle and an absorbent member resting therein and projecting upwardly therefrom, of a single means for simultaneously supplying water of condensation to said receptacle, heating said absorbent member and causing a current of air to flow over and in contact with said absorbent member to cause evaporation therefrom.

7. A humidifier comprising a water receptacle, means for absorbing water in said receptacle and conducting the water by capillary attraction to a point above the water level in said receptacle, a steam coil arranged to heat the part of the absorbing means above the water receptacle, to discharge its water of condensation into said receptacle, and to cause a column of heated air to rise in contact with the exposed moist surface of said absorbing means, whereby said air is humidified.

8. The combination with a water pan of an unglazed tile resting therein and projecting therefrom, a source of low pressure steam supply, a steam coil arranged to discharge condensation into said pan, and arranged around and adjacent to said tile, so as to heat the tile and cause a current of heated air to rise in contact with the moistened surface of said tile, the connection between said coil and said pan being arranged to provide a water seal to prevent the escape of steam from the coil into the pan.

9. In a vacuum heating system, the combination with means tending to produce a vacuum at the return end of said system, a heating coil forming part of said system, a vessel adapted to contain water, a porous element projecting therefrom surrounded by said coil, a discharge pipe from said coil to the lower part of said vessel, and a conduit connected to said discharge pipe at a level intermediate the top and bottom of said vessel and in operative connection with said means tending to produce a vacuum in said system, substantially as described.

10. The combination with a vacuum heating system, of means tending to produce a vacuum in the return end of said system, a heating coil interposed in said system, a water receptacle, a porous element projecting from said water receptacle, a discharge pipe arranged to conduct water of condensation from said coil to said receptacle and to provide a water seal between said coil and said receptacle, and a conduit connected with said discharge pipe above the lowest point of the trap portion of said discharge pipe and below the top of said water receptacle and in operative communication with said means tending to produce a vacuum.

FRANK J. DOUGLASS.

Witnesses:
　G. Y. SKINNER,
　R. C. THORESON.